(12) United States Patent
Rowles et al.

(10) Patent No.: US 6,307,841 B1
(45) Date of Patent: Oct. 23, 2001

(54) NETWORK ANALYSIS SYSTEM

(75) Inventors: Christopher David Rowles, Belgrave; Christopher Andrew Leckie, Brighton; Michael Colin Flower, Blackburn; Catherine Rye Senjen, Northcote, all of (AU)

(73) Assignee: Telstra Corporation Limited, Melbourne (AU)

( * ) Notice: Subject to any disclaimer, the term of this patent is extended or adjusted under 35 U.S.C. 154(b) by 0 days.

(21) Appl. No.: 09/029,008

(22) PCT Filed: Aug. 16, 1996

(86) PCT No.: PCT/AU96/00511

§ 371 Date: May 15, 1998

§ 102(e) Date: May 15, 1998

(87) PCT Pub. No.: WO97/07614

PCT Pub. Date: Feb. 27, 1997

(30) Foreign Application Priority Data

Aug. 16, 1995 (AU) .................................................. PN4796

(51) Int. Cl.[7] .............................. G08C 15/00; H04J 1/16
(52) U.S. Cl. ........................................... 370/252; 370/242
(58) Field of Search ................................... 370/252, 241, 370/242, 244, 245, 247, 248, 250, 251; 714/2, 4, 25, 27

(56) References Cited

U.S. PATENT DOCUMENTS

| | | | |
|---|---|---|---|
| 5,068,823 | * | 11/1991 | Robinson .......................... 395/500 |
| 5,185,849 | * | 2/1993 | Miyazawa et al. ...................... 395/3 |
| 5,446,874 | | 8/1995 | Waclawsky et al. . |
| 5,627,766 | * | 5/1997 | Beaven ........................... 364/551.01 |

FOREIGN PATENT DOCUMENTS

| | | |
|---|---|---|
| 20062/95 | 12/1995 | (AU) . |
| 0 503784 | 9/1992 | (EP) . |
| 2271918 | 4/1994 | (GB) . |

\* cited by examiner

*Primary Examiner*—Dang Ton
*Assistant Examiner*—Toan Nguyen
(74) *Attorney, Agent, or Firm*—Flehr Hohbach Test Albritton & Herbert LLP

(57) ABSTRACT

A network analysis system obtains parameter data generated by telecommunications network equipment, in which the parameter data represents operational parameters of the network. The network analysis system processes the parameter data to generate symptom data from test procedures that are applied to the parameter data. Fault data is generated that is representative of faults that may have occurred, on the basis of the symptom data and relationship data representative of the relationship between the symptom data and the faults. The relationship between a symptom and a fault represents likelihood of the symptom being caused by the fault. The system also generates occurrence data that is representative of faults that probably have occurred, on the basis of the fault data.

26 Claims, 8 Drawing Sheets

NETWORK ANALYSIS SYSTEM

FIELD OF THE INVENTION

The present invention relates to a network analysis system and method.

BACKGROUND OF THE INVENTION

Telecommunications systems include sophisticated electronic switching equipment which is able to provide extensive data on the state and performance of the equipment and other aspects of a telecommunications system. Mobile telecommunications systems, in particular, are subjected to a wide variety of operating conditions which depend to a substantial extent on the movement and use of mobile telecommunications stations. The operating conditions of a mobile system include an unpredictable element and can give rise to a variety of different faults which need to be detected. The equipment of mobile telecommunications systems and, in particular, the base stations used in the systems, generate a considerable amount of data from which faults can be determined. It would be advantageous to be able to monitor a telecommunications network by accessing data which may be pertinent to fault determination and then analyse that data to detect faults.

SUMMARY OF THE INVENTION

In accordance with the present invention there is provided a network analysis system including:
  means for obtaining parameter data generated by equipment of a telecommunications network, said parameter data representing operational parameters of said network,
  means for processing said parameter data to generate symptom data from test procedures applied to said parameter data, and
  means for generating fault data, representative of faults which may have occurred, on the basis of said symptom data and relationship data representative of the relationship between said symptom data and said faults.

Advantageously, said fault data may further represent the likelihood of said faults having occurred.

Preferably said system further includes a graphical user interface for establishing and adjusting said relationship data.

Preferably said system further includes means for generating occurrence data, representative of faults which probably have occurred, on the basis of said fault data.

Preferably said occurrence data generating means applies predetermined rules to said fault data to generate said occurrence data. Preferably said occurrence data generating means compares fault data associated with a plurality of said equipment having a predetermined relationship to generate said occurrence data. Depending on said relationship, the occurrence data generating means may remove from consideration fault data for one of said plurality of said equipment.

In accordance with the present invention there is also provided a network analysis system including:
  means for obtaining parameter data generated by equipment of a telecommunications network, said data representing operational parameters of said network,
  means for processing said parameter data to generate fault data representative of faults which may have occurred, and
  means for generating occurrence data representative of faults which probably have occurred on the basis of said fault data.

The present invention also provides a network analysis method including:
  obtaining parameter data generated by equipment of a telecommunications network, said parameter data representing operational parameters of said network,
  processing said parameter data to generate symptom data from test procedures applied to said parameter data, and
  generating fault data, representative of faults which may have occurred, on the basis of said symptom data and relationship data representative of the relationship between said symptom data and said faults.

The present invention further provides a network analysis method including:
  obtaining parameter data generated by equipment of a telecommunications network, said data representing operational parameters of said network,
  processing said parameter data to generate fault data representative of faults which may have occurred, and
  generating occurrence data representative of faults which probably have occurred on the basis of said fault data.

BRIEF DESCRIPTION OF THE DRAWINGS

A preferred embodiment of the present invention is hereinafter described, by way of example only, with reference to the accompanying drawings, wherein.

DETAILED DESCRIPTION OF THE PREFERRED EMBODIMENTS

Figure 1:
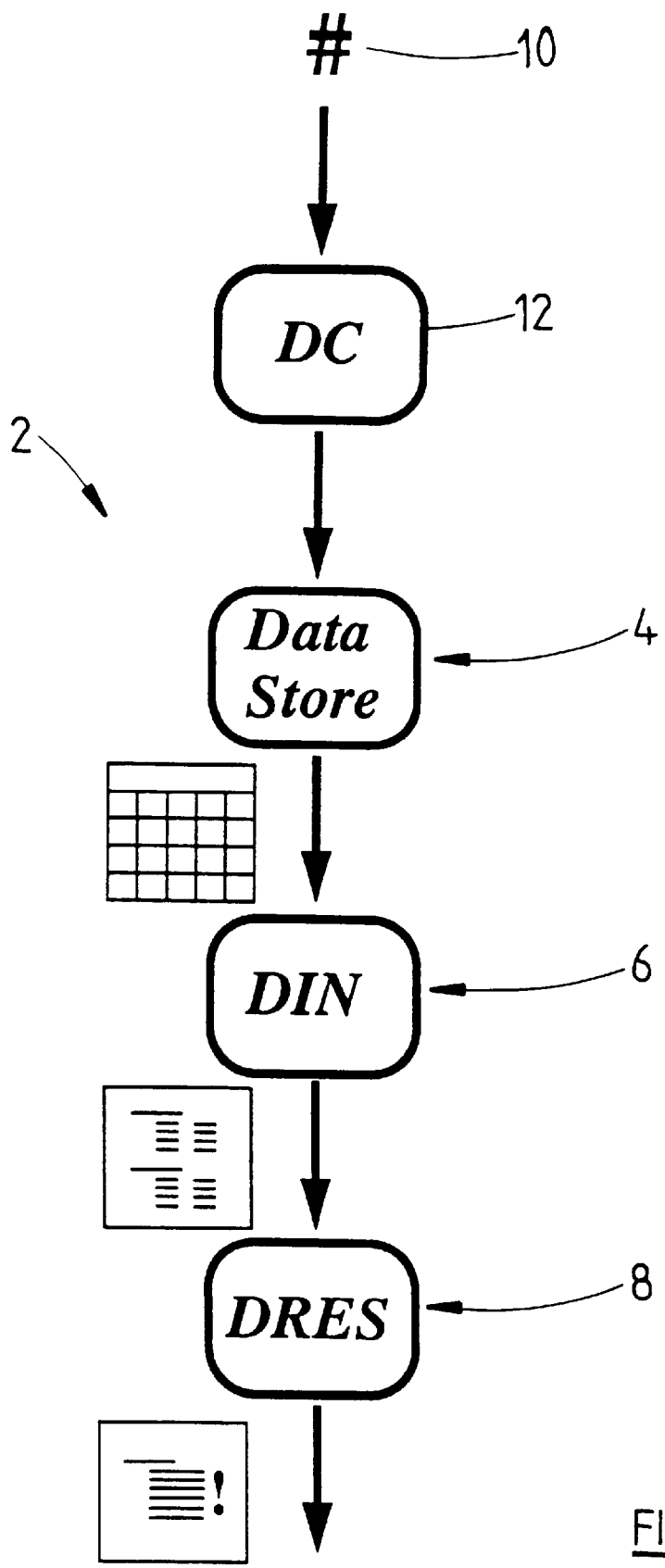
FIG. 1 is a block and flow diagram of a preferred embodiment of a network analysis system.

A network analysis system 2, as shown in FIG. 1, is a computer based system which includes a data storage system 4, a diagnostic inference network (DIN) 6, a diagnostic and recommendation expert system (DRES) 8 and an X-Windows based user interface. Although a software implementation on a computer workstation, such as Sun Microsystems Sparc Station 5 running Unix, is described hereinafter, the analysis system 2 can be implemented using specific hardware components or in software, or using a combination of both. The software of the system 2 has been written in C++ and for the DRES 8, the code was written using the OPS 5 rule language which compiles to C.

Network performance data is automatically generated by equipment of a network 10, such as the base station of a mobile telecommunications network, and is automatically collected by a data collection system 12 and provided to the data storage system 4. The data collection system 12 may be provided by a Common Application Platform (CAP) which is a software package that interfaces with the analysis system 2 and the equipment of the network 10. The CAP schedules the execution of data collection and post-processing programs on the equipment, and can also be used to schedule execution of modules of the analysis system 2. The CAP includes commands that can be executed to access the network data automatically from the equipment and load it into the data storage system 4 of the analysis system 2. For a mobile telecommunications network, the performance data collected may include:

- MT data generated by mobile telephone exchanges in order to describe the configuration of the network (e.g. cells, voice channels, control channels and inter-cell relationships);
- CTS (cell traffic statistics) data generated by mobile telephone exchanges and representative of summary statistics on mobile telephone traffic (e.g. accesses, drop-outs and handoffs) over a predetermined measurement period, typically four to eight hours;
- RES (radio environment statistics) data generated by mobile telephone exchanges and representative of summary statistics on the radio performance of an exchange, such as signal strength, signal to noise ratios over a predetermined measuring period, typically four to eight hours; and
- RDR (radio disturbance recording) data generated by mobile telephone exchanges and representative of statistics on radio interference in the network over a predetermined measurement period.

Figure 2:
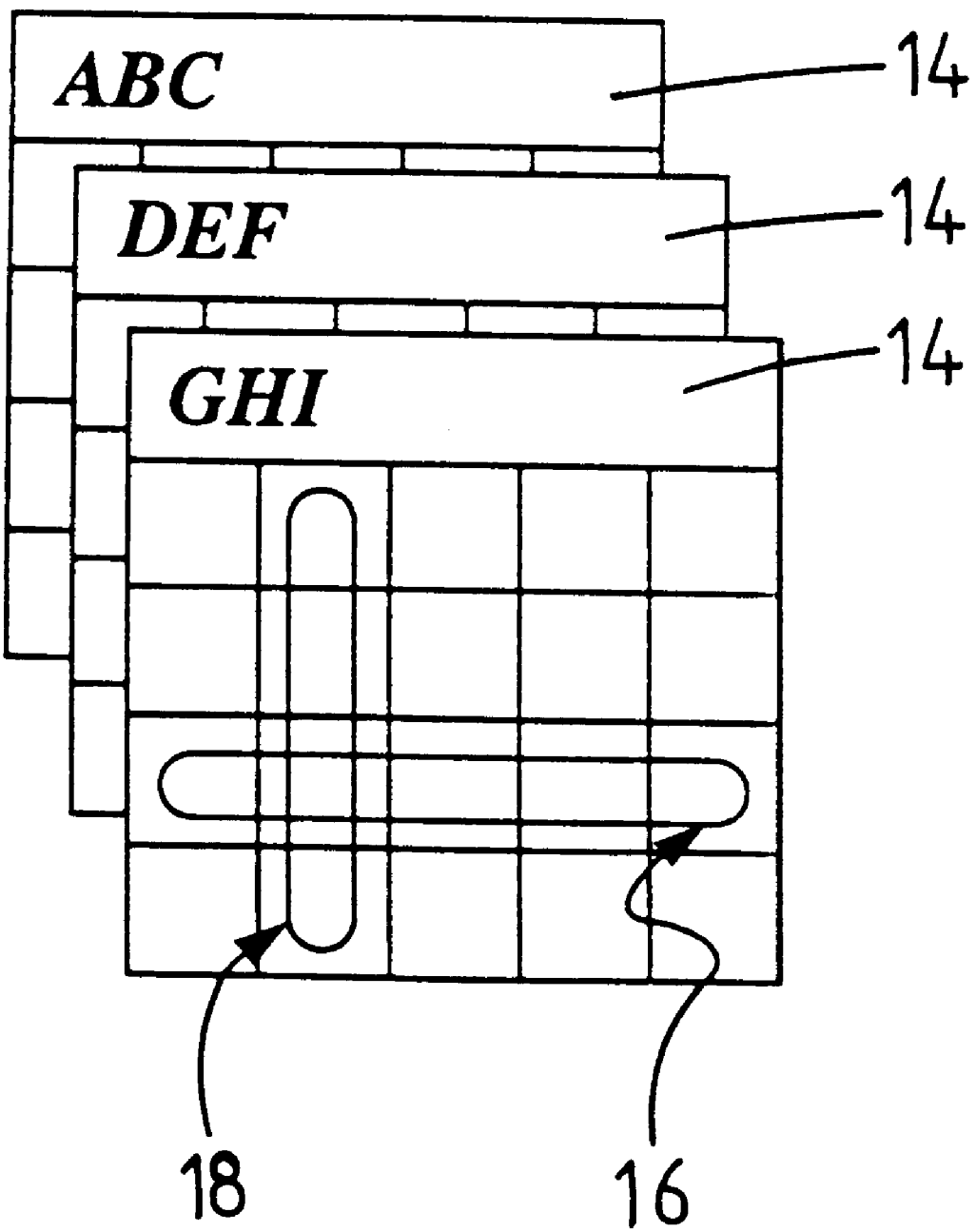
FIG. 2 is a schematic diagram illustrating storage of performance indicators in a data store of the system.
Figure 3:
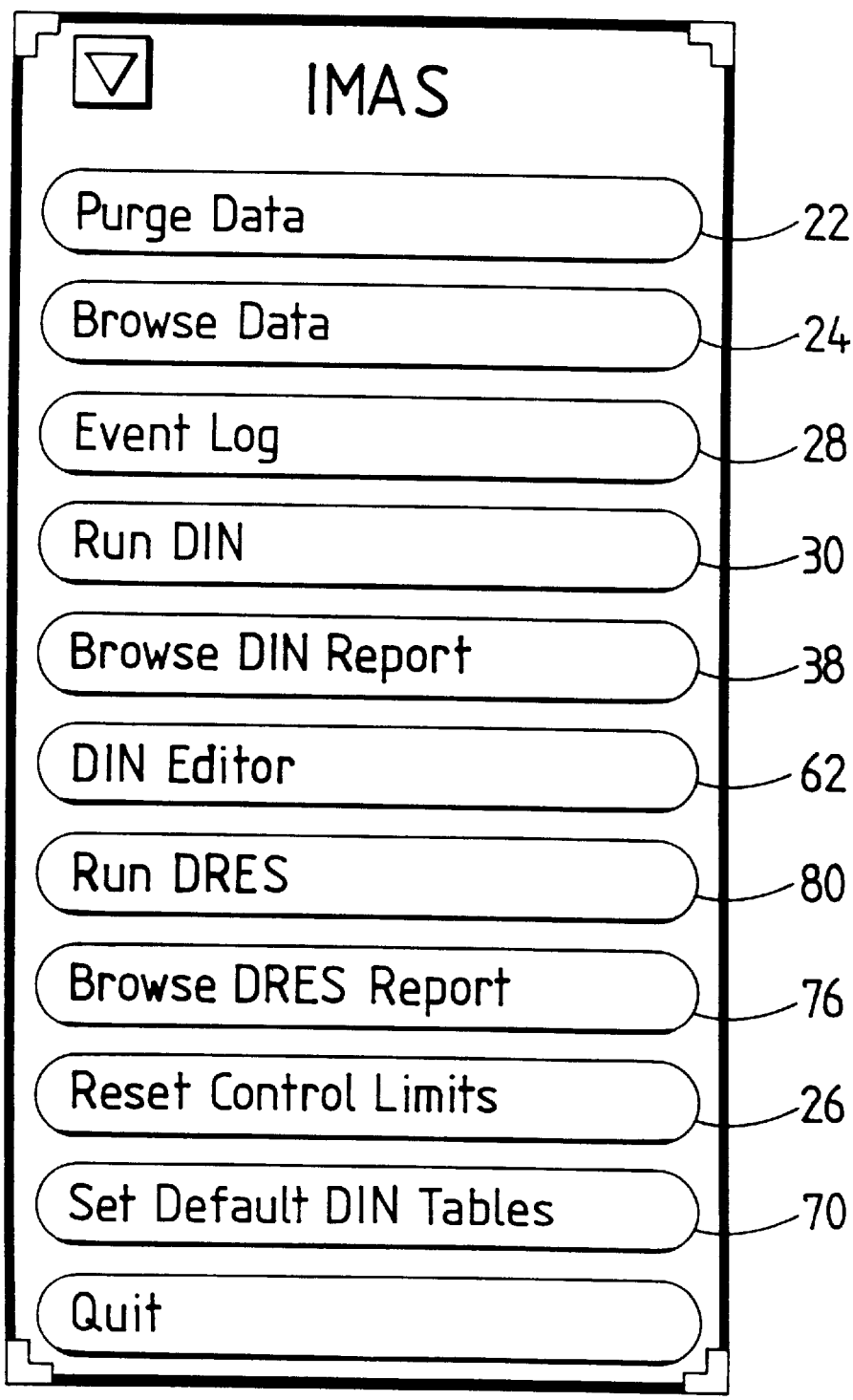
FIG. 3 is a diagram of a main menu of the system.

The data storage system 4 establishes a database for the network performance data, whilst also providing tools to access the data and a description of the network configuration. The network data represents a number of different network performance indicators which correspond to network objects, such as telephone exchanges, cells of a mobile cellular network, base stations or communications channels. A list of the network performance indicators which can be processed by the analysis system 2 for a mobile telecommunications network is provided on pages 16 to 19. Data for each network object is stored in a hierarchical representation with the data for each performance indicator for a network object being stored in a matrix relationship, as shown in FIG. 2. For each network object 14 a row 16 of performance data represents the data collected over one day for a number of performance indicators, whereas a column 18 includes a chronological history of data collected for one performance indicator for an object 14. The user interface of the analysis system 2 provides main menu 20, as shown in FIG. 3, which provides the user with access to tools for accessing the data by selecting the following command buttons on the interface 20:

1. Purge data 22 allows data to be selectively removed.
2. Browse data 24 allows the collected network data to be displayed and scrolled through for different network objects, and also allows data to be graphically plotted for any performance indicator for any object and for any time period, with information concerning control limits for network data and special events which have occurred.
3. Reset control limits 26 allows control limits for network performance indicators to be reset. The control limits for an indicator provide upper and lower limits (UCL and LCL) on the random variation expected for the indicator. The limits can be used to determine when selected events occur and for defining symptoms used by the DIN 6. The reset control limits procedure also enables the control limits to be checked by applying statistical comparisons to new limits and old limits to generate a report specifying which control limits may need to be reset for network objects and their performance indicators.
4. Event log 28 allows a log to be made for any known disturbance of a network object which might otherwise be perceived as a fault by the DIN 6 or the DRES 8.

Once data has been collected and stored in the data storage system 4, the data can be applied to the DIN 6 by selecting the run DIN command button 30.

Figure 4:
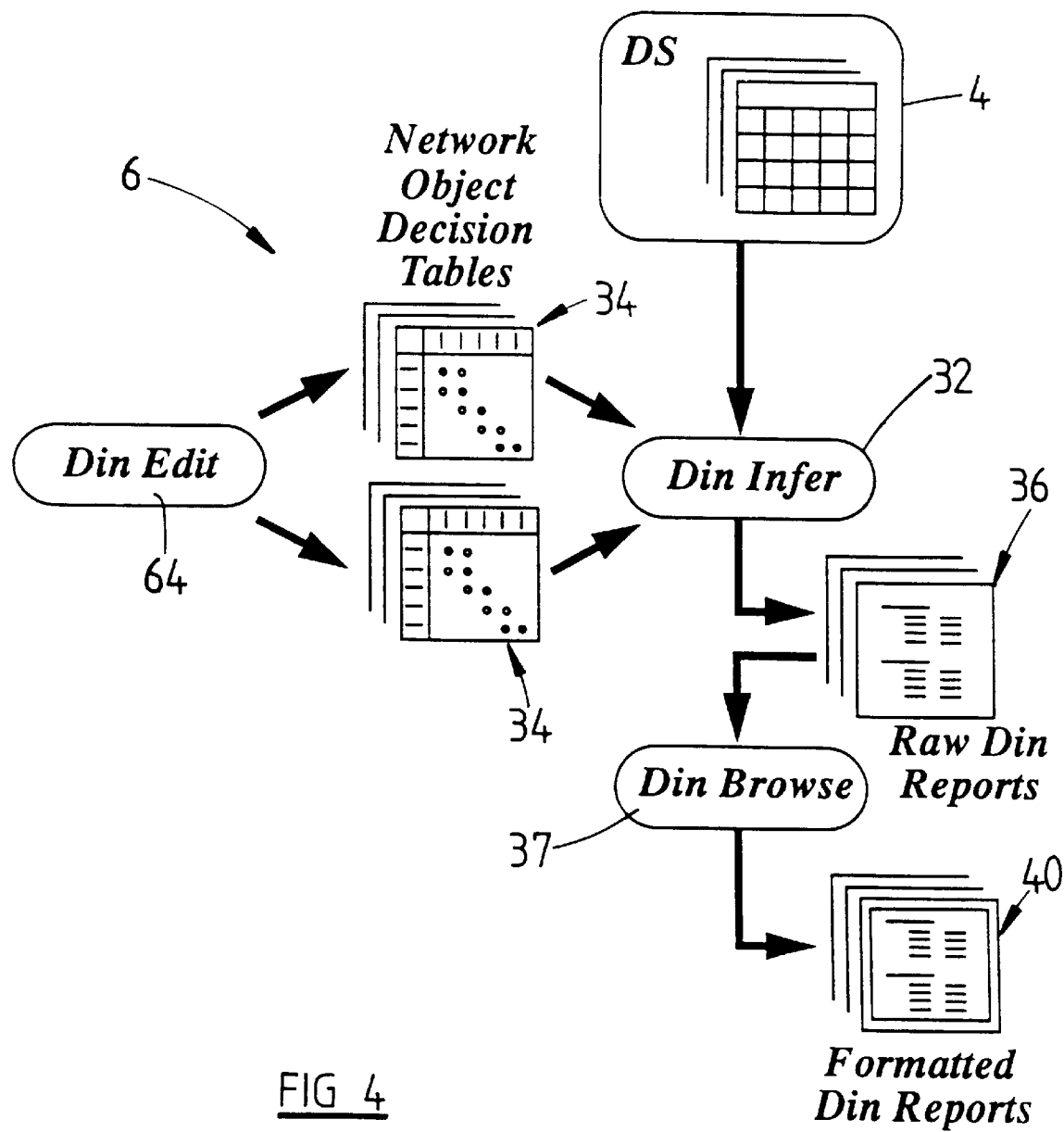
FIG. 4 is a block and flow diagram of a diagnostic inference network of the system.

The DIN 6 is a program which performs a preliminary diagnosis of problems in the telecommunications network by analysing network objects, such as cells or exchanges, in isolation. The DIN 6, as shown in FIG. 4, uses an inference engine 32 to detect changes in the network performance indicators of network objects using decision tables 34 for each object, and then suggesting the cause of the changes in a DIN report 36 generated by the inference engine 32. A DIN report 36 contains the results of applying a decision table to network performance data of a network object for a particular date. The reports 36 are saved in unformatted data files which can be examined and formatted as required using a DIN browser module 37, selected by the browse DIN report button 38, to produce formatted DIN reports 40.

The DIN 6 is able to monitor large amounts of network performance data and quickly diagnose possible faults indicated by the data. This is achieved by constraining the complexity of the reasoning used to diagnose faults. The faults are each characterised by a pattern of symptoms, which are determined from the performance data for a network object. The patterns are each represented by a mathematical formula based on the relationships between a fault and its symptoms. This produces a decision network of symptoms leading to faults which is established by telecommunications experts and represented in the decision tables 34, as described below. This in contrast to neural network techniques which use training algorithms to establish a decision network and implicitly encode fault symptom relationships as weights in the network based on a set of training examples.

Figure 5:
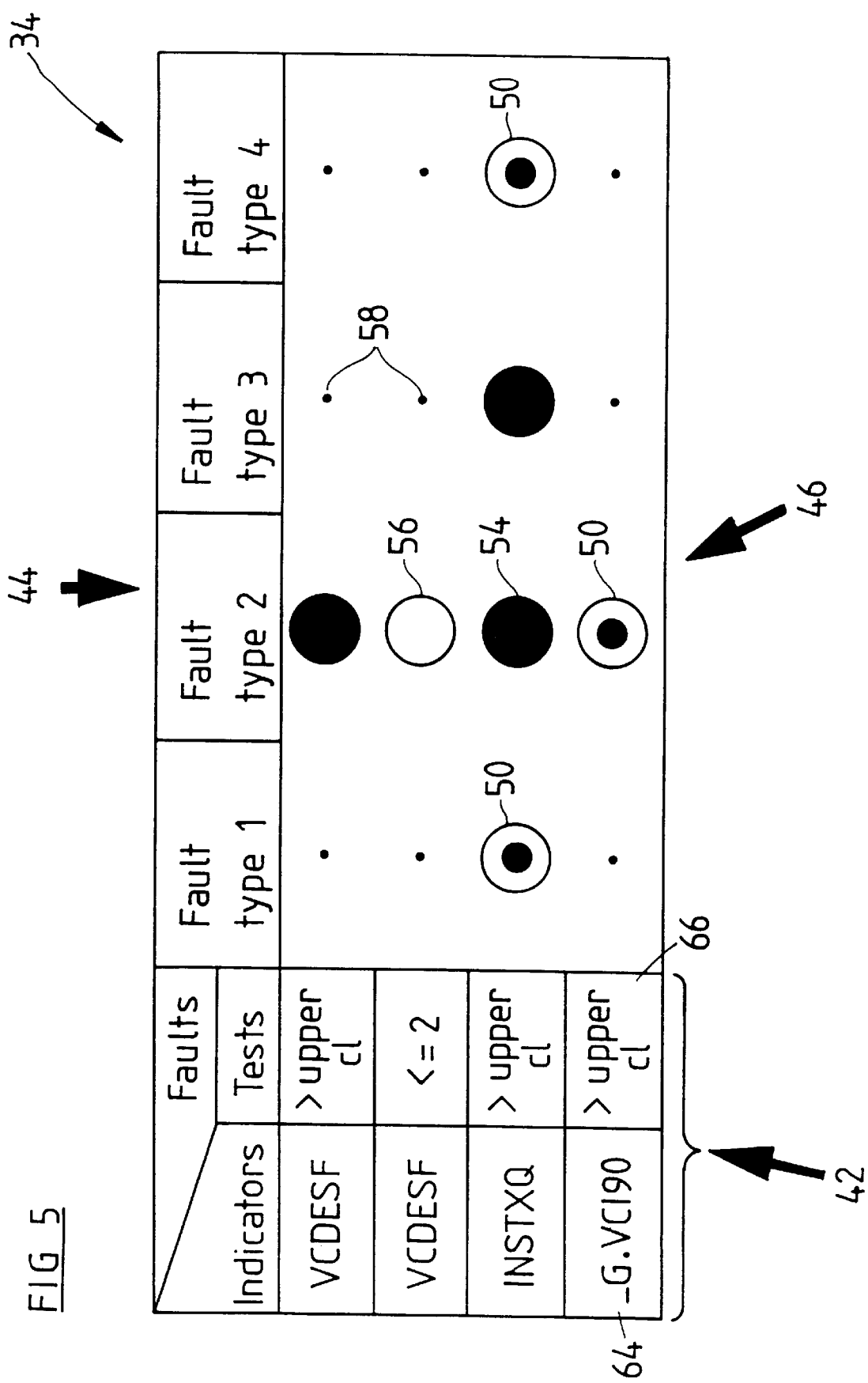
FIG. 5 is a diagram of a decision table display of the system.

A decision table 34 is represented graphically on the user interface as shown in FIG. 5, and retains information concerning a list of symptoms 42 to be monitored by the DIN 6, a list of faults 44 which can be inferred by the DIN 6 and a set of relationships 46 between the faults 44 and the symptoms 42. The faults 44 are allocated respective columns of the decision table 34, and the symptoms are allocated respective rows of the decision table 34. A relationship between a fault 44 and a symptom 42 is specified at the intersection for the column of the fault 44 and the row of the symptom 42. The table 34 is used by the DIN 6 to monitor possible problems, i.e. symptoms 42, in a network object, and to suggest likely causes of these problems, i.e. faults 44.

A symptom 42 is the result of a test applied to a network performance indicator, such as "traffic overflow greater than 10%". A symptom is determined for a network object at a particular date i by extracting the value of the indicator $x_i$ on that date, and applying the symptom's test to that value. If the indicator value is unavailable at that date, then the symptom value is unknown, otherwise the symptom value is true or false.

A number of different tests can be applied to the performance indicators and the tests are normally one of four main types: threshold tests; difference tests; moving average tests; and control limit tests. For example one of the following tests may be selected for a symptom:

$X_i < \{threshold\}$ $x_i <= \{threshold\}$ $x_i = \{threshold\}$ $x_i > \{threshold\}$ $x_i >= \{threshold\}$ $100*(x_i-x_{i-1})/x_{i-1} > \{threshold\}$ $-100*(x_i-x_{i-1})/x_{i-1} > \{threshold\}$ $x_i > mean(x_{i-1}) + \{n\} * std\text{-}dev(x_{i-1})$ $x_i < mean(x_{i-1}) - \{n\} * std\text{-}dev(x_{i-1})$ $x_i >$ upper control limit $x_i <$ lower control limit $x_i$ outside control limits (upper or lower)

$x_i$ within control limits (upper & lower)

Faults 44 are the possible causes of the symptoms 42, for example "faulty transceiver". The network objects each have their own set of faults which can be selected for inclusion in the decision table 34. The DIN 6 rates the likelihood of each fault for a network object based on the status of each symptom that is related to the fault.

The symptoms may each be caused by many faults, and similarly each fault may cause a number of symptoms. The more active symptoms there are that can indicate a fault, the more likely it is that the fault exists. The DIN 6 accumulates evidence for each fault by looking at the values of the symptoms that are related to the fault. There are five types of relationships 46 which a symptom 42 can have to a fault 44, and these are: positive; negative; necessary; prohibited; and null.

Figure 6:
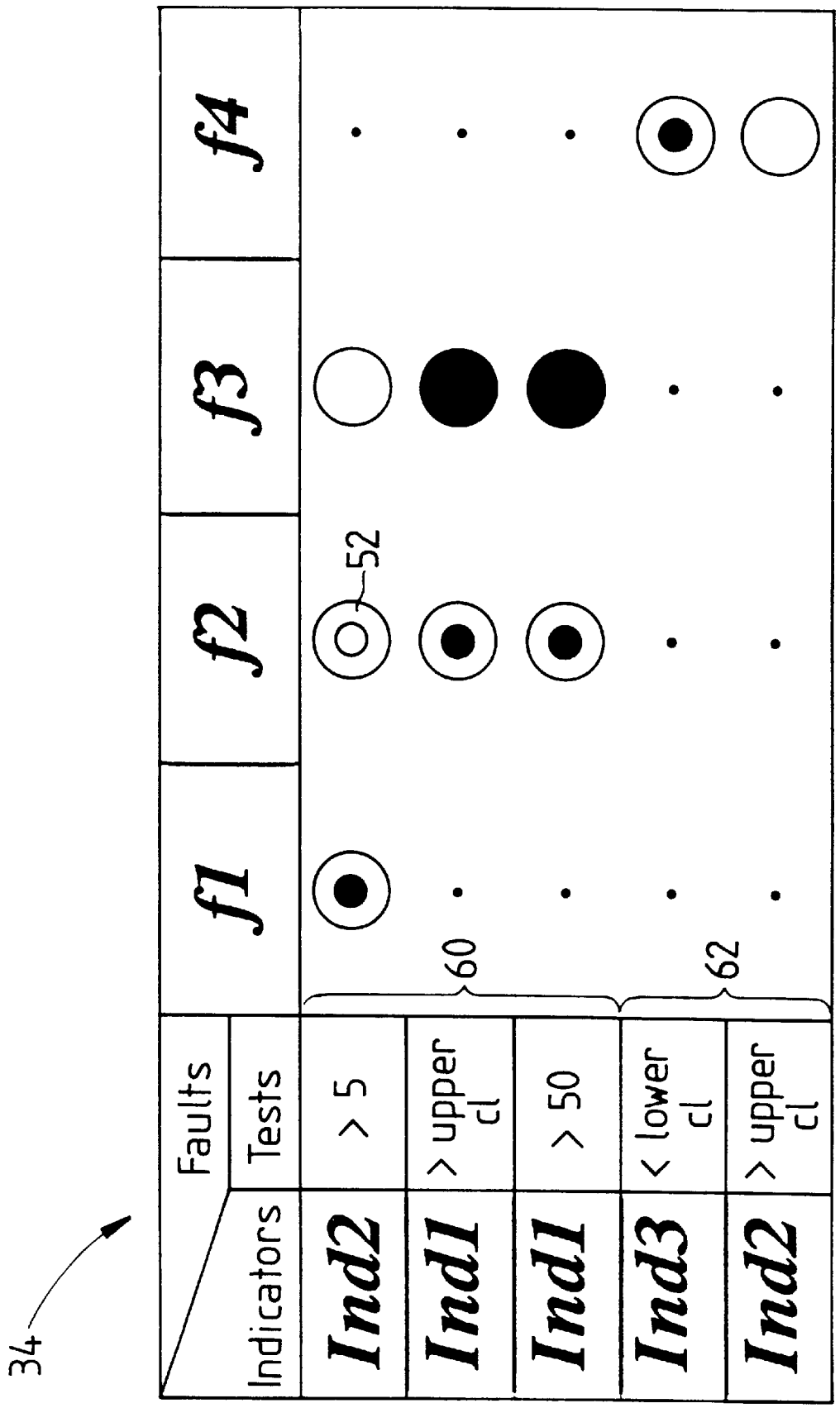
FIG. 6 is a diagram of another decision table display of the system.

A positive relationship 50, as indicated on the user interface by a white circle with a black circle inside it, means that when the symptom is active (i.e. true), the fault is a possible cause. A negative relationship 50, as indicated by a white circle with a small white circle inside of it, as shown in FIG. 6, means that when the symptom is active, the fault is unlikely to be the cause. A necessary relationship 54, as indicated by a dark circle, means that the symptom must be active for the fault to be considered active. A prohibited relationship 56, as indicated by a white circle, means that if the symptom is active then it cannot be caused by the fault. A null relationship 58, as indicated by a small black dot, means that the fault is not indicated by the symptom in any way. Positive relationships can be used to trigger faults whilst negative relationships can be used to filter faults.

The likelihood of a fault being active is determined by looking at the status of the symptoms to which it is related. For a fault to be active, all of its necessary symptoms and none of its prohibited symptoms must be active. If it has no necessary relationships to symptoms, then at least one positive symptom must be active for the fault to be active. The DIN 6 decides that a fault is active if the number of active positive symptoms is greater than 0 and there are no necessary symptoms inactive and no prohibited symptoms active. The DIN 6 generates a fault likelihood weighting which is:

0, if there are inactive necessary symptoms, active prohibited symptoms or no active positive symptoms; or the number of active positive symptoms, if there are no unknown symptom values or negative symptoms; or the number of active positive symptoms divided by the sum of the active symptoms and inactive symptoms, and half the number of unknown symptom values.

If a fault is active, then it is given a ranking based on the likelihood weighting:

| | |
|---|---|
| $>= 0.66$ | very likely |
| $>= 0.33 \ \& < 0.66$ | likely |
| $> 0 \ \& < 0.33$ | possible |
| $0$ | unlikely |

Using the decision table 34 shown in FIG. 6 for a network object with the following network performance indicators:

| Indicator | Value | LCL | UCL |
|---|---|---|---|
| Ind1 | 1000 | 200 | 800 |
| Ind2 | 7 | 0 | 10 |
| Ind3 | 2 | 1 | 8 | will cause the DIN 6 to generate the result that faults f1 and f2 are very likely, whereas f3 and f4 are unlikely. The result occurs because the first three symptoms 60 are true and the last two symptoms 62 are false. The likelihood ranking for f1 is 1.0 (very likely), for f2 is 0.67 (very likely) and for f3 and f4 is 0 (unlikely).

Selecting the DIN editor command button 62 invokes a DIN edit module 64 which allows the decision tables 34 to be edited as desired for each network object. DIN edit 64 provides a graphic user interface which allows the user to point to elements in a table 34 and select using a pointing device how the user wishes the table to appear. For example, symptom/fault relationships 46 are specified by pointing and clicking on a symptom/fault intersection. First a white circle with an inner black circle will appear and if the user clicks again, the circle will be entirely black. A further click brings up a white circle and then another click will bring up a white circle with a small white circle inside of it. A final click produces the small black dot which indicates the null relationship. Movement through the different relationships 46 is circular. By clicking on either a fault label 44, network performance indicator label 64 or test label 66, a user is presented with a pop-up window from which a number of different faults, indicators or tests can be selected. The decision table 34 can then be allocated to an object of the network. Default decision tables 34 can also be set using a set default DIN tables procedure by selecting the set default DIN tables button 70. The DIN reports 36 and 40 provide the details of the objects which have been analysed, the decision tables which have been used, and the type of performance data which has been used. The data is normally specified by a date or reference to a data file name. Symptoms are described by their status (active, inactive or unknown) and faults are described by their status (very likely, likely, possible or unlikely) together with a summary of the evidence for the fault.

Figure 7:
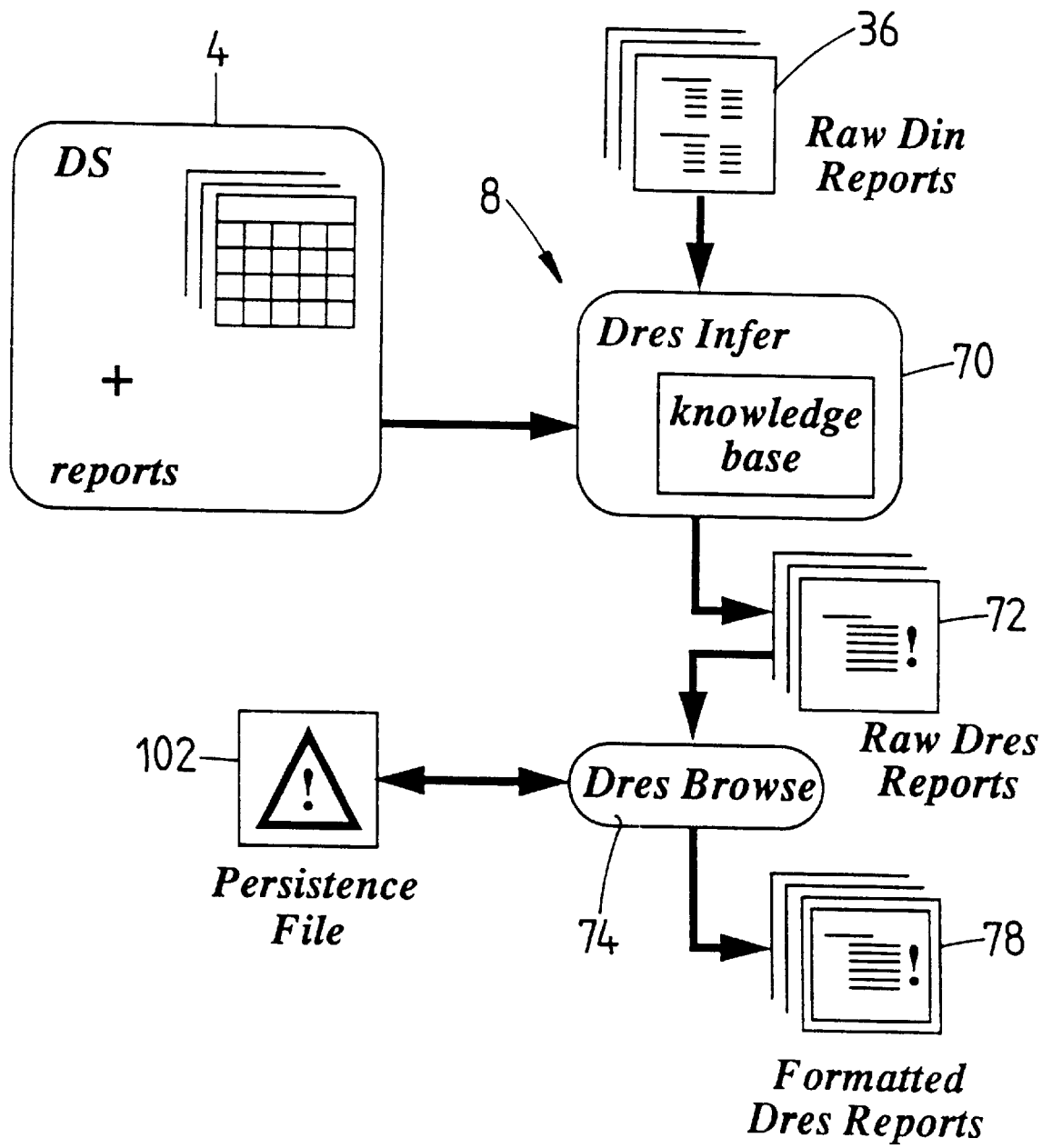
FIG. 7 is a block and flow diagram of a diagnostic and recommendation expert system of the system of FIG. 1.

The DRES 8, as shown in FIG. 7, includes a rule-based expert system 70 which uses the raw DIN reports 36 and data accessed from the data storage system 4 concerning network objects to generate raw reports 72 which reduce the list of possible faults to a list of confirmed faults. The DRES 8 also includes a DRES browser module 74, which is activated by selecting the browse DRES report button 76, to allow the raw DRES reports 72 to be displayed and reformatted into user defined formatted DRES reports 78. The expert system 70 is invoked by selecting the run DRES button 80 from the main menu 20.

Figure 8:
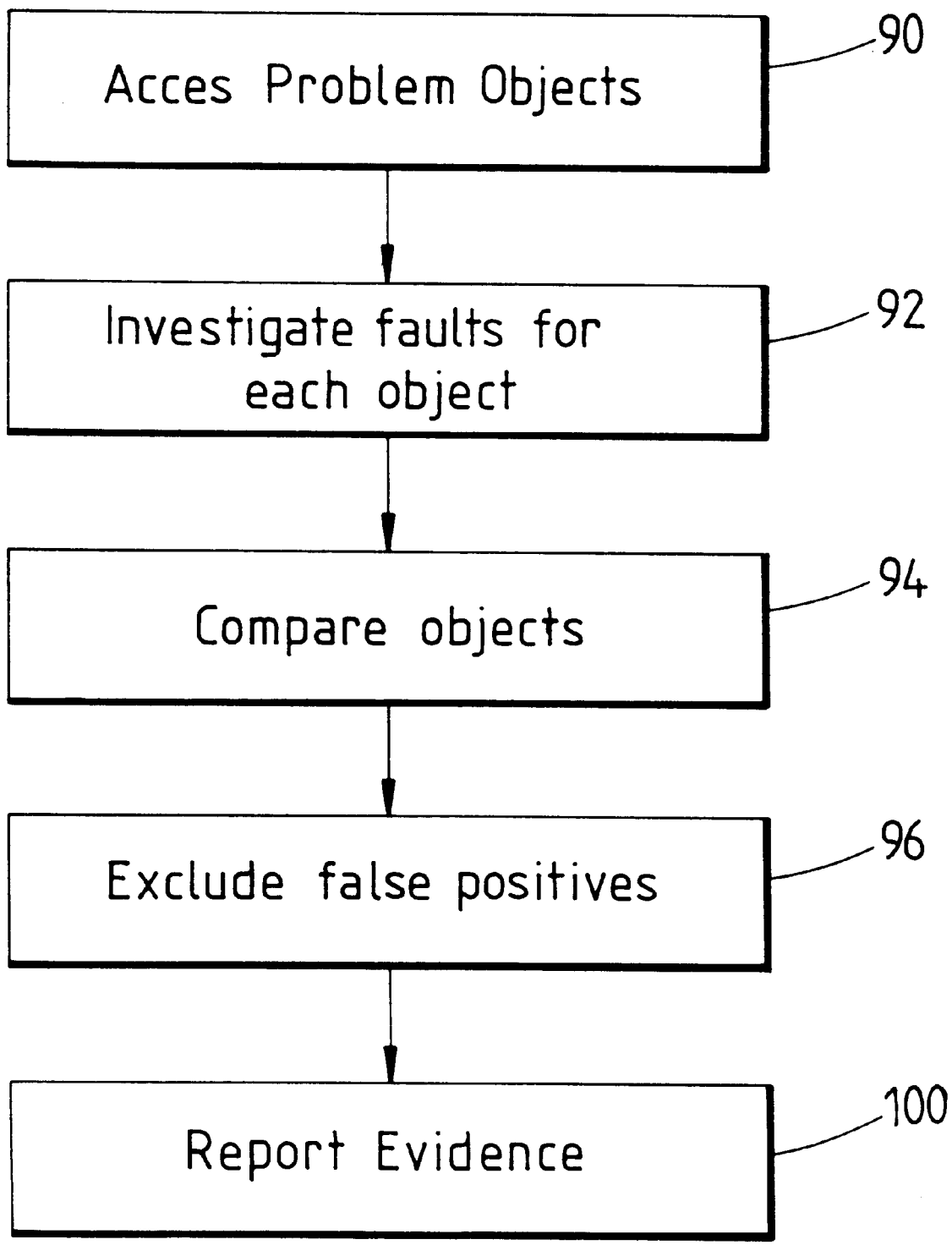
FIG. 8 is a flow diagram for the diagnostic and recommendation expert system of FIG. 7.

The DRES expert system 70 analyses network objects in combination using a day's network performance data at a time to provide a detailed level of fault diagnosis. On initiation, DRES 8 accesses all of the data concerning problem network objects from the DIN 4 during an initial procedure 90, as shown in FIG. 8. The DRES 8 then enters an investigation procedure 92 where the faults are investigated for each object identified by the DIN 6 as containing potential faults. The investigation procedure 92 first accesses external information concerning a network object using post-processing programs to further confirm particular faults specified by the DIN 6. The post-processing programs are programs which are available for accessing the performance data generated by an exchange so as to produce consolidated reports on the performance data. For a mobile cellular network, information is accessed to determine one channel higher, one channel lower, Voice Channel (VC) uplink interference and faulty VC, every second channel low and various faults in order to collect further evidence for the following faults: reduced VC transmitter (TX) power; fault in TX path at base; faulty VC transceiver; faulty VC transceiver; VC uplink interference; loss of PCM link to exchange; clicking transceiver; incorrect Power level (PL) value; and reduced VC IX power.

The investigation procedure 92 also accesses and checks information concerning related network objects. For a mobile cellular network, each base station may establish one or more cells which may overlap to some extent with adjacent cells. A base station is connected to a telephone exchange of the network for the switching of calls and the cells of a station can form a group known as a cell cluster, which can share carrier frequencies. An ncell is a neighbouring cell which can be used to receive a handoff when the current cell must force a call in progress to handoff to another cell. A dcell is a nearby cell to the current cell which is used when a cell receives call attempts that it is unable to handle, and the station or exchange needs to redirect these calls to one or more nearby cells. An nocell is an ncell that is on a different exchange to the current cell. The following table shows faults and ncell/dcell/nocell information that is obtained by the investigation procedure 92. For instance if DIN 6 has indicated that there may be a loss of PCM link to the exchange then DRES 8 will check whether there has been an increase in DRVCC or TRAFOV in the ncell of this cell. A further rule checks that the ncell/dcell evidence is higher than a preset threshold (TRAFOV/DROPHO>1% and VCDESF/INSTXQ>2%o), as a significance test on input data. A description for the alphanumeric acronyms used for the network performance indicators is provided on pages 16 to 19.

| Fault | Type of Cell | Indicator(s) |
|---|---|---|
| Loss of PCM link | ncell/nocell | DRVCChigh, TRAFOVhigh |
| Loss of PCM link | dcell | TOTACChigh |
| Fault in CC redundancy switch | ncell/nocell | TRAFOVhigh |
| Special event (high) | ncell/nocell | TRAFOVhigh |
| Special event (low) | ncell/nocell | HOFONP>1 |
| Misdirected Rx antenna | ncell/nocell | TOTACChigh |
| Base station hardware fault | ncell/nocell | TRAFOVhigh |
| Faulty SS receiver (high) | ncell/nocell | INSTXQhigh |
| Faulty SS receiver (low) | ncell/nocell | DROPHOhigh |
| Faulty Rx antenna | ncell/nocell | TRAFOVhigh |
| Loss of PCM link | ncell/nocell | TRAFOVhigh |
| Fringe cell cover problem | ncell | No. of cells <3 |

After accessing the external information and the related object information, DRES 8 then uses the investigation procedure 92 to perform a detailed network object analysis using three different types of rule groups: problem not confirmed, further tests within an object and general versus specific. Examples of the problem not confirmed group for a mobile cellular network are as follows:

If there is indirect evidence for a "loss of PCM link to exchange" or "base station hardware fault", then check whether this evidence comes from cells within the same base and remove it if it does not;

If there is no indirect evidence to support the fault "loss of PCM link to exchange", "fault in CC redundancy switch" or "faulty SS receiver low" then remove this fault; and If there is a fault "incorrect interexchange handoff data" and the cell is not a border cell, then remove this fault.

Examples of further tests within a network object, for a mobile telecommunications cell are as follows:

If there is a fault "faulty Rx antenna" then check whether HOFFI and HOFFO are about 50%, and add it as additional evidence if it is;

If there is a fault "faulty SS receiver low" then check whether HOFFO is greater than HOFFI and add it as additional evidence if it is;

If there is a fault "incorrect interexchange handoff data" then check whether DRVCC is less than 10, if it is not remove the evidence;

If there are faults "special event high traffic", "cell capacity problem", "loss of VC transceiver" then check whether TRAFOV is greater than 5%, if it is not remove the evidence; and If both a "faulty Rx antenna" and a "misdirected Rx antenna" are indicated in the same cell, then remove the "misdirected Rx antenna".

A general versus specific rule has the following format: if there is a fault "X" and there is a fault "Y" and that fault has no indication of "Z" then remove fault "Y". For example, if there is a fault "loss of VC transceiver", and there is a fault "faulty VC transceiver", and there is no evidence of _G.BS25 high or _G.VCI90 high, then remove the fault "faulty VC transceiver".

The DRES 8 then executes a compare procedure 94 which accesses a group of rules to compare related network objects. The group of rules check whether indirect evidence for one fault is also direct evidence for another fault. For instance, if there is a cell A that has some indirect evidence X from cell B and in cell B that evidence is the only piece of evidence then remove faults associated with this evidence X from cell B. For example, if cell A has the fault "loss of PCM link" with indirect evidence of high TRAFOV from cell B, and there is any faults in cell B with high TRAFOV as their only evidence, then remove those faults. An exclusion procedure 96 is then used to exclude false positives by using a group of rules that checks whether performance indicators relate to aspects of the network which can be misconstrued as faults, such as that which may be caused by an overlayed cell, a small cell or use of a low noise amplifier to extend cell range, and are abnormal but valid network conditions. For example, if a cell has high DROPHO, high VCDESF, high _G.VCI90 and high REGATT, then the cell may have a low noise amplifier, which is not a fault.

The final procedure 100 of DRES 8 invokes modules to retrieve recommendations for dealing with the remaining faults and write the raw DRES reports 72 out to a file. The modules collect all of the evidence and information concerning the remaining faults and their associated network objects. The DRES reports 72 generated include a summary report which contains the number of occurrences of faults allocated to a network object, and detailed reports which list faults identified by DRES 8 and persistent faults. The DRES browse procedure 74 includes an option to select a persistence module which allows a user to create or modify a persistence file 102 which includes symptoms defined to be persistent for nominated network objects. A user can associate tests to be applied when a persistent symptom is found to be active to try and override the symptom. If all of the symptoms of a fault are persistent and neither of the associated tests succeed, then the fault is defined to be persistent and is placed into a persistent fault section at the end of a DRES report 72. A user can set a date on which a persistence test for a symptom is no longer applied.

The rules described above for the DRES 8 are indicative of the types of rules required to analyse fault data and we have described the overall organisation of the rule base. The form and detail of these rules depends almost entirely on the technology and implementation of the network to be analysed. Since networks, their performance and method required for analysis depend upon the technology used, design criteria and regional characteristics, the DRES analysis rules must be tailored to the particular details of the network concerned and cannot be circumscribed without detailed network knowledge.

| MOBILE NETWORK PERFORMANCE INDICATORS | | |
|---|---|---|
| REGATT | Registration Attempts | |
| TOTACC | Total call accesses | |
| MSORG | MS Originating Traffic (%) | |
| MSTERM | MS Terminating Traffic (%) | |
| DRVCC | Directed Retry Due to Voice Channel Cong. (%) | |
| PAGE1 | Response to first page (%) | (No longer used) |
| TRAFOV | Traffic Overflow (%) | |
| VCSZE | VC Seizures | |
| TOTLOC | Total number of locatings | |
| LOHOFA | No. of locatings per handoff attempt | |
| HOFAIL | Failed handoffs (%) | |
| HOFFO | Total number of handoffs out | |
| HOFONP | Handoffs to non-primary cell (%) | |
| HOFAILO | Failed/Unsuccessful Handoffs out (%) | |
| HOFFI | Total number of handoffs in | |
| HOFINP | Handoffs in as non-primary cell (%) | |
| HOFAILI | Failed/unsuccessful Handoffs in (%) | |
| VCDESF | VC Designation Failures (%) | |
| DROPHO | Dropouts at handoff (%) | |
| INSTXQ | Dropouts due to insufficient Tx Quality (%) | |
| CALLDO | Call Dropouts (%) | |
| HINSTX | Handled Insufficient TX Dropouts (%) | (No longer used) |
| CPROGDO | Calls in Progress Dropout (%) | |
| DRUPR | Directed Retry due to Unknown Page Response | |
| UPRREJ | Unknown Page Response Rejection Ratio | |
| HORATIO | HOFFSI/HOFFSO | |
| HOFFITOT | Total unsuccessful HO in | |
| HOFFOTOT | Total unsuccessful HO out | |
| A<SSACC | Accesses < SSAC | |
| VCSZCII | VC seize rejected C/I in | |
| VCSZCIO | VC seize rejected C/I out | |
| ACCMULT | Multiple accesses | |
| ACCALL | All accesses (including those less than SSACC) | |
| SATFOUT | SAT fail out | |
| SATFIN | SAT fail in | |
| R<SSREG | Registrations < SSREG | |
| _ML.1 | Local control activated on deblocked CHM | |
| _ML.10 | Return from local control made | |
| _ML.70 | PMU alarm SWR too high | |
| _ML.182 | Illegal Station Class Mark | |
| _ML.208 | Measured request outside line | |
| _ML.220 | Failed VC start at handoff | |
| _ML.221 | Failed VC start at handoff | |
| _ML.222 | Disc poor transmit quality | |
| _ML.223 | SAT verification Failure | |
| _ML.224 | 100 VC start failure | |
| _ML.225 | Handoff start failure | |
| _ML.226 | 65% VC start failure | |
| _ML.254 | 26VBAT < 25.4V | |
| _ML.257 | Rx-board + 12V voltage out of range | |
| _ML.261 | AIO-unit +5V reference out of range | |
| _ML.263 | A-channel for CC diversity error | |
| _ML.264 | B-channel for CC diversity error | |
| _ML.266 | LOL1 out of range | |
| _ML.267 | A-channel for VC diversity error | |
| _ML.268 | B-channel for VC diversity error | |
| _ML.307 | Modem hardware or software failure | |
| _ML.314 | FGTX synthes lock failure detected | |
| _ML.322 | PMU detected SWR from antenna too high | |
| _ML.323 | Multi coupler failure on A-channel | |
| _ML.324 | Multi coupler failure on B-channel | |
| _ML.325 | Multi coupler failure on A & B-channels | |
| _ML.338 | Minor output power regulation loop failure | |
| _ML.341 | PA-unit output regulation failure | |
| _ML.343 | PA-unit failure detected | |
| _ML.346 | PA-unit output regulation failure (PALEVEL too high) | |
| _ML.347 | PA-unit output regulation failure (PALEVEL too low) | |
| _ML.348 | PA-unit output regulation failure (output power too high) | |
| _ML.349 | PA-unit output regulation failure (output power down 1 dB) | |

-continued

MOBILE NETWORK PERFORMANCE INDICATORS

| | | |
|---|---|---|
| _ML.350 | Too high SWR on PA-unit output | |
| _ML.351 | One of two PA-unit temperature detectors faulty | |
| _ML.352 | 26V regulator board faulty | |
| _ML.353 | Overtemperature on PA-unit detected | |
| _ML.356 | AIO hardware failure | |
| _ML.359 | FGRX-unit synthes lock failure | |
| _ML.361 | Modem hardware or software failure | |
| _ML.364 | S/W Exec. queue nearly full | |
| _ML.377 | Reference osc alarm in connected CHM | |
| _G.%<ACC | % of non-compensated access levels below SSACC | |
| _G.%OCC | Percentage occupancy of unblocked voice channels | |
| _G.BLK | Number of blocked devices in the cell | |
| _G.BNC10 | 10 percentile of non compensated signal strength received by all channels in the busy state | |
| _G.BNC50 | 50 percentile of non compensated signal strength received by all channels in the busy state | |
| _G.BNC90 | 90 percentile of non compensated signal strength received by all channels in the busy state | |
| _G.BS15 | Busy Sat to noise less than 15 dB | |
| _G.BS20 | Busy Sat to noise less than 20 dB | |
| _G.BS25 | Busy Sat to noise less than 25 dB | |
| _G.BS30 | Busy Sat to noise less than 30 dB | |
| _G.CCAI10 | 10 percentile average signal strength received by the control channel on accesses when the channel was idle | |
| _G.CCAI50 | 50 percentile average signal strength received by the control channel on accesses when the channel was idle | |
| _G.CCAI90 | 90 percentile average signal strength received by the control channel on accesses when the channel was idle | |
| _G.C/I10 | % of Carrier to Interference measurements below 10 dB | |
| _G.C/I15 | % of Carrier to Interference measurements below 15 dB | |
| _G.C/I18 | % of Carrier to Interference measurements below 18 dB | |
| _G.C/I20 | % of Carrier to Interference measurements below 20 dB | |
| _G.C/I25 | % of Carrier to Interference measurements below 25 dB | |
| _G_NACCS | Number of true accesses | |
| _G.VCI10 | 10 percentile of non compensated signal strength received by the channels when in the idle state | |
| _G.VCI50 | 50 percentile of non compensated signal strength received by tbe channels when in the idle state | |
| _G.VCI90 | 90 percentile of non compensated signal strength received by the channels when in the idle state | |
| CUSTACCF | Customer perceived access failures (%) | |
| CPROGDO | Call in progress dropouts (%) | |
| NETCONG | Network congestion (%) | |
| SERVLOS | Service Loss | (No longer used) |
| TOTACC | Total call accesses | |
| TOTDHO | Total Dropouts incl. handoffs | |
| TOTDROP | Total Dropouts excl. handoffs | |
| TRAFOV | Traffic Overflow (%) | |
| ACCUPR | Accesses due to unknown Page Response | (No longer used) |
| DROPHO\U | Dropouts at handoff (%) | |
| DRSUC | Successful directed retry responses (%) | |
| INSTXQ | Dropouts due to insufficient TX Quality (%) | |
| PAGE1 | Response to first page | |
| PAGECON | Page Congestion | |
| PAGESUC | Successful Pages | |
| SATFAIL | SAT Failures | |
| UNCREG | Unconfirmed registrations | |
| UNSUCHO | Unsuccessful handoffs | |
| UPRDR | UPR not leading to Directed Retry | (No longer used) |
| VCDESDR | VC Designation Failures (dir retry) (%) | |
| VCDESF | VC Designation Failures (all) (%) | |
| VCSZE | Voice Channel Seizures | |
| DO>5 | Number of cells DO>5% | |
| R<SSREG | Registration attempts < SSREG | |
| ACCALL | All accesses including < SSACC | |
| A<SSACC | Accesses < SSACC | |
| ACCMULT | Multiple accesses | |
| VCSZUHO | Unsuccessful VC seizures at HO | |
| VCSZCI | VC seizures rejected - low C/I | |
| _G.BS10 | total SAT to noise performance in percentage at the 10 dB level | |
| _G.BS15 | total SAT to noise performance in percentage at the 15 dB level | |
| _G.BS20 | total SAT to noise performance in percentage at the 20 dB level | |
| _G.BS25 | total SAT to noise performance in percentage at the 25 dB level | |
| _G.BS30 | total SAT to noise performance in percentage at the 30 dB level | |
| _G.CI10 | total Carrier to Interference performance percentage for 10 dB | |
| _G.CI15 | total Carrier to Interference performance percentage for 15 dB | |
| _G.CI18 | total Carrier to Interference performance percentage for 18 dB | |

-continued

| MOBILE NETWORK PERFORMANCE INDICATORS | |
|---|---|
| _G.CI20 | total Carrier to Interference performance percentage for 20 dB |
| _G.CI25 | total Carrier to Interference performance percentage for 25 dB |
| _G.RSS10 | 10 signal strength percentiles for all of the channels in all of the channels in all of the cells under consideration |
| _G.RSS50 | 50 signal strength percentiles for all of the channels in all of the channels in all of the cells under consideration |
| _G.RSS90 | 90 signal strength percentiles for all of the channels in all of the channels in all of the cells under consideration |

Modifications and variations maybe made to the disclosed embodiments without departing from the subject and spirit of the invention as defined by the following claims.

What is claimed is:

1. A network analysis system including:
means for obtaining parameter data generated by equipment of a telecommunications network, said parameter data representing operational parameters of said network collected during actual operating conditions;
means for processing said parameter data to generate symptom data from test procedures applied to said parameter data; and
means for generating fault data, representative of faults that may have occurred during said actual operating conditions, on a basis of said symptom data and relationship data representative of relationship between said symptom data and said faults.

2. A network analysis system according to claim 1, wherein said relationship data represents respective relationships between symptoms, corresponding to said symptom data, and to said faults, and said relationship between one of said symptoms and one of said faults represents likelihood of the symptom being caused by the fault.

3. A network analysis system according to claim 2, wherein said relationship is a relationship selected from a group consisting of positive, negative, necessary, prohibited, and null.

4. A network analysis system according to claim 3, wherein said fault data indicates a fault may have occurred when symptom data for said fault indicates a number of active positive symptoms greater than zero, there are no necessary symptoms inactive, and no prohibited symptoms active.

5. A network analysis system according to claim 4, further including a graphical user interface to establish and to adjust said relationship data.

6. A network analysis system according to claim 5, further including a network object decision table that provides said relationship data for said equipment.

7. A network analysis system according to claim 1, wherein said fault data further represents likelihood of said faults having occurred.

8. A network analysis system according to claim 1, further including means for generating occurrence data, representative of faults that probably have occurred, on a basis of said fault data.

9. A network analysis system including:
means for obtaining parameter data generated by equipment of a telecommunications network, said data representing operational parameters of said network collected during actual operating conditions; and
means for processing said parameter data to generate fault data representative of faults that may have occurred; and
mean for generating occurrence data representative of faults that probably have occurred during said actual operating conditions, on a basis of said fault data.

10. A network analysis system according to claim 9, wherein said occurrence data is generated by applying predetermined rules to said fault data for said equipment.

11. A network analysis system according to claim 10, wherein fault data of a plurality of said equipment having a predetermined relationship is compared to generate said occurrence data.

12. A network analysis system according to claim 11, wherein fault data for one of said plurality of said equipment determined not to be representative of a fault that has probably occurred is not used to generate said occurrence data.

13. A network analysis system according to claim 12, wherein said occurrence data is generated on a basis of further processing of said parameter data.

14. A network analysis method comprising the following steps:
obtaining parameter data generated by equipment of a telecommunications network, said parameter data representing operational parameters of said network collected during actual operating conditions;
processing said parameter data to generate symptom data from test procedures applied to said parameter data;
generating fault data, representative of faults that may have occurred during said actual operating conditions, on a basis of said symptom data and relationship data representative of relationship between said symptom data and said faults.

15. A network analysis method according to claim 14, wherein said relationship data represents respective relationship between symptoms, corresponding to said symptom data, and said faults, and relationships between one of said symptoms and one of said faults represents likelihood of the symptom being caused by the fault.

16. A network analysis method according to claim 15, wherein said relationship is a relationship selected from a group consisting of positive, negative, necessary, prohibited and null.

17. A network analysis method according to claim 16, wherein said fault data indicates a fault may have occurred when the symptom data for the fault indicates that the number of active positive symptoms is greater than zero, there are no necessary symptoms inactive, and no prohibited symptoms active.

18. A network analysis method according to claim 17, further including providing a graphical user interface to establish and to adjust said relationship data.

19. A network analysis method according to claim 18, further including a network object decision table that provides said relationship data for said equipment.

20. A network analysis method according to claim 14, wherein said fault data further represents likelihood of said faults having occurred.

21. A network analysis method according to claim 14, further including the step of generating occurrence data, representative of faults that probably have occurred, on the basis of said fault data.

22. A network analysis method comprising the following steps:

obtaining parameter data generated by equipment of a telecommunications network, said data representing operational parameters of said network collected during actual operating conditions;

processing said parameter data to generate fault data representative of faults that may have occurred; and generating occurrence data representative of faults that probably have occurred during said actual operating conditions on a basis of said fault data.

23. A network analysis method according to claim 22, wherein said occurrence data is generated by applying predetermined rules to said fault data for said equipment.

24. A network analysis method according to claim 23, wherein fault data of a plurality of said equipment having a predetermined relationship is compared to generate said occurrence data.

25. A network analysis method according to claim 24, wherein fault data for one of said plurality of said equipment determined not to be representative of a fault that has probably occurred is not used to generate said occurrence data.

26. A network analysis method according to claim 25, wherein said occurrence data is generated on a basis of further processing of said parameter data.

* * * * *